No. 840,903. PATENTED JAN. 8, 1907.
J. A. BUCKNALL.
WEED DIGGER.
APPLICATION FILED OCT. 15, 1906
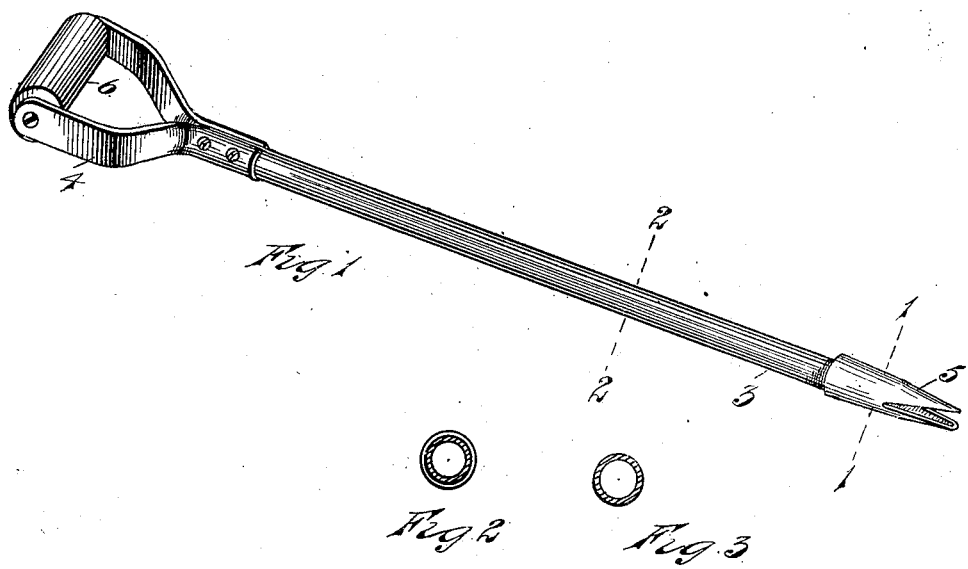
WITNESSES
C. E. Day
May E. Kott
INVENTOR
Joseph A. Bucknall.
By Parker & Burton,
Attorneys.

UNITED STATES PATENT OFFICE.

JOSEPH A. BUCKNALL, OF DETROIT, MICHIGAN.

WEED-DIGGER.

No. 840,903.

Specification of Letters Patent.

Patented Jan. 8, 1907.

Application filed October 15, 1906. Serial No. 338,959.

*To all whom it may concern:*

Be it known that I, JOSEPH A. BUCKNALL, a citizen of the United States, residing at Detroit, county of Wayne, State of Michigan, have invented a certain new and useful Improvement in Weed-Diggers; and I declare the following to be a full, clear, and exact description of the invention, such as will enable others skilled in the art to which it pertains to make and use the same, reference being had to the accompanying drawings, which form a part of this specification.

This invention relates to weed-diggers. It has for its object an improved implement adapted and intended to be used for the purpose of cutting and removing weeds from the ground, especially those weeds which have long tap-roots.

In the drawings, Figure 1 is a perspective of the tool. Fig. 2 is a section at line 1 1 of Fig. 1. Fig. 3 is a section at 2 2 of Fig. 1.

The tool consists of a tubular body 3, contracted at its cutting end or, as shown in Fig. 1, with an attached terminal cap 5, formed with its cutting edges inwardly inclined toward the longitudinal axis and provided at its cutting end with inclined edges made by cutting the tool diagonally to its long axis. The inclined cutting edges preferably meet at a diameter across the tubular stem of the tool, at the end thereof. The cutting end of the tool is small with reference to the handle end, and any mass of material that is forced into the tool at its cutting end will move easily and readily upward when the tool is forced over additional material until the chamber within the tool is filled or at least until the material extends along the chamber from the cutting end to the handle end, and any material that is in the tool can be readily removed therefrom at the handle.

The chamber within the tool opens through the shank of the handle 4, which is secured to the body 3 of the tool in any convenient way, as by riveting strap-shanks from the cross-bar 6 of the handle to the body 3. The cutting end of the cap 5 is placed over a weed, with one member of the cutter at each side of the root, the end of the tool forced into the ground as far as may be desired, generally from two to three inches, the tool given a twist or turn, and lifted. The tool brings up with it a large portion of the root of the weed, which remains in the body of the tool until delivered from the handle end thereof.

What I claim is—

1. A tool for removing weeds, consisting of a tube provided with a diagonal cutting end and with a chamber expanding from the cutting end toward the handle end, substantially as described.

2. A tool for removing weeds, consisting of a tube provided with pointed cutters having a space between said cutters expanding from the point of the tool toward the handle thereof, substantially as described.

In testimony whereof I sign this specification in the presence of two witnesses.

JOSEPH A. BUCKNALL.

Witnesses:
   CHARLES F. BURTON,
   MAY E. KOTT.